Aug. 12, 1941.　　　　E. N. WOOD　　　　2,252,242
GAS AND VAPOR CLEANING APPARATUS
Filed Feb. 13, 1939　　　　4 Sheets-Sheet 2

Aug. 12, 1941. E. N. WOOD 2,252,242
GAS AND VAPOR CLEANING APPARATUS
Filed Feb. 13, 1939 4 Sheets-Sheet 3

INVENTOR.
EVERETT N. WOOD
BY Paul, Paul, Moore & Giese
ATTORNEYS

INVENTOR.
EVERETT N. WOOD

Patented Aug. 12, 1941

2,252,242

UNITED STATES PATENT OFFICE 2,252,242

GAS AND VAPOR CLEANING APPARATUS

Everett N. Wood, Minneapolis, Minn.

Application February 13, 1939, Serial No. 256,141

14 Claims. (Cl. 183—24)

The present invention relates to an apparatus for cleaning gases or vapors, and to an apparatus for separating liquids from vapors or gases. The apparatus of the invention may take various forms and in its several modifications is suitable for the cleaning of the intake air stream of internal combustion engines, air compressors and the like, for the removal of entrained dust particles or moisture particles therefrom, for use in air conditioning installations wherein the air within a building is cleaned as it is circulated, for the removal of condensed water particles from steam, for the removal of condensed moisture or hydrocarbon particles from gas mains, and to a wide variety of other installations where it is desired to free a gas or vapor of entrained solid or liquid particles.

It is a general object of the invention to provide a gas or vapor cleaning mechanism capable of carrying out the above functions of removing solid or liquid matter from a gas or vapor stream.

More specifically, it is an object to provide a mechanism capable of removing solid particles from air.

It is a further object of the invention to provide a mechanism capable not only of removing the solid or liquid entrained particles from gas or vapors but of trapping such particles out of the gas or vapor flow in a condition such that they may be removed easily when the mechanism is opened for cleaning and servicing.

It is also an object of the invention to provide a mechanism capable of separating solid or liquid particles from a gas or liquid flow, which mechanism is capable of extracting such particles without excessively impeding the flow of the gases or vapors through such mechanism.

It is a further object of the invention to provide a mechanism of the foregoing character which is capable of being readily disassembled for cleaning.

It is a further object of the invention to provide an air filter unit of the type suitable for air conditioning equipment for use either once (after which it is discarded) or as a permanent cleanable unit.

It is also an object of the invention to provide a device for injecting oil or other cleaning liquid into a gas or vapor stream and for finely dispersing such oil or other cleaning liquid regardless of the velocity of the gases through such mechanism thereby to effectively remove entrained liquid or solid particles from the gas or vapor stream.

It is also an object of the invention to provide a new method and apparatus for dispersing oil or other cleaning fluid into a gas or vapor stream in which the oil or other cleaning fluid is projected along a surface and torn from such surface at an edge in fine particles, and to provide a plurality of such apparatus in opposed relation so that the projected fine particles torn from the edges of such apparatus are turbulently redirected and thereby additionally dispersed.

It is a specific object of the invention to provide a structure for application to internal combustion engines, air compressors or the like, for removing solid particles from the air stream intake to such engines.

It is also an object of the invention to provide as articles of manufacture, baffle plates for use in multiple for separating solid or liquid particles from an air stream and to provide as an article of manufacture a sump and nozzle structure for the aforementioned apparatus.

Other objects of the invention are those inherent in the apparatus herein described and illustrated.

The invention is illustrated with reference to the drawings in which

Figure 8 illustrates a larger capacity modification of the type of device shown in the foregoing Figures 1 through 7. Figure 8 is a side elevational view broken away to illustrate the interior thereof in several successive planes.

The casing portion is sectioned for the most part along the line 8—8 of Figure 9.

Figure 9 is a rear elevational view partly in section of the device shown in Figure 8. This figure is likewise broken away to show the interior structure of the apparatus, the casing being sectioned along the line 9—9 of Figure 8.

Figure 12 is a front elevational view of an air filter unit for use in air conditioning installations, and the like.

In all of the figures the same numerals and characters apply to the same or corresponding parts.

Single unit engine air cleaner

Figure 1:
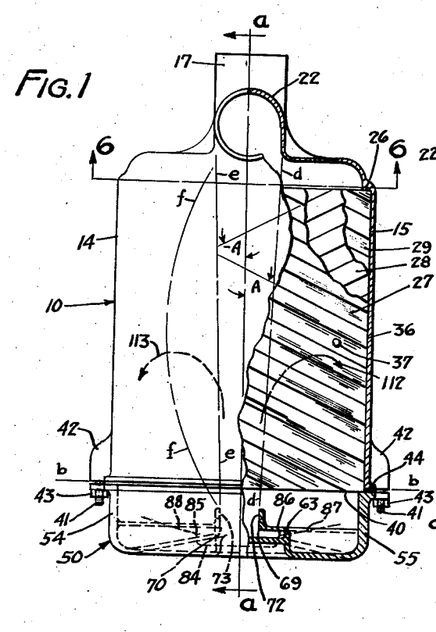
Figure 1 is a rear elevational view partly broken away and sectioned of a specific embodiment of the present invention. The sectioned part of Figure 1 is taken along the line I—I of Figure 2.
Figure 2:
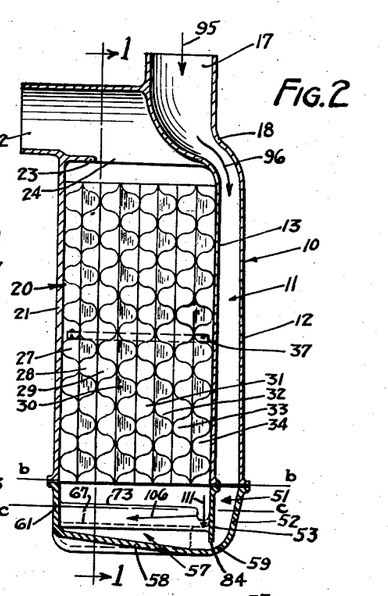
Figure 2 is a side, sectional view along the lines a—a of Figure 1.
Figure 3:
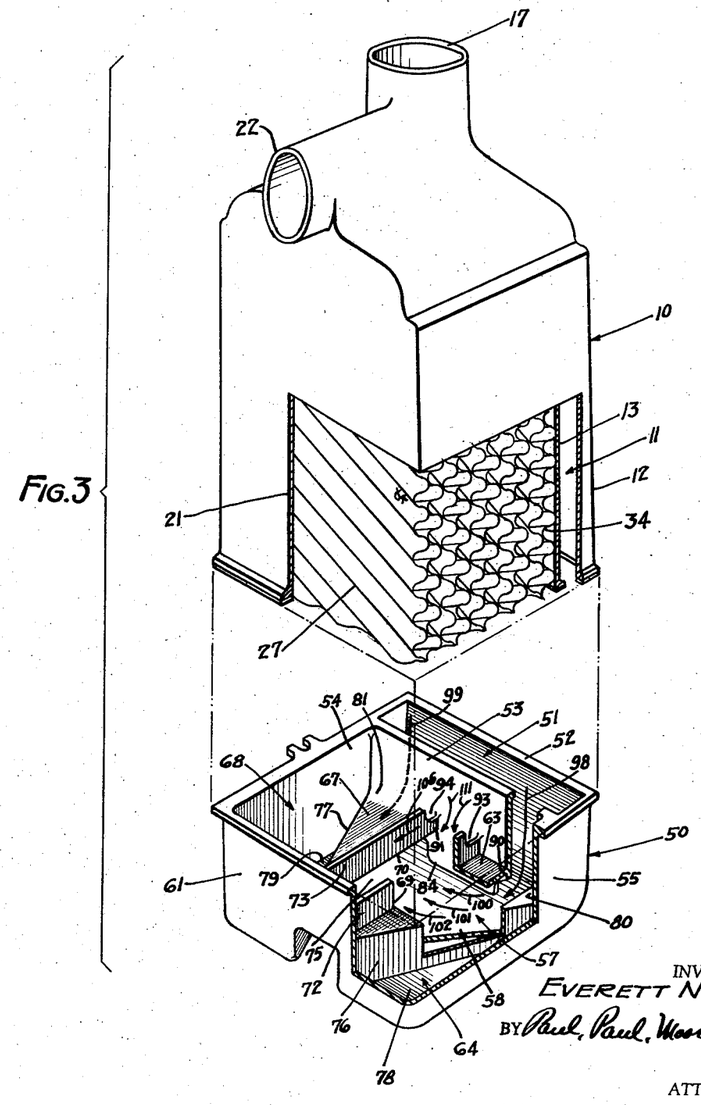
Figure 3 is a separated view in perspective of the mechanism illustrated in Figures 1 and 2. The upper and lower portions are broken away and sectioned to illustrate the interior thereof.

One form of the present invention which is particularly adapted for the cleaning of intake air for automotive engines, air compressors, and the like, is illustrated in Figures 1 through 7, and particularly Figures 1, 2, and 3. The apparatus on the whole consists of an upper casing generally designated 10, and a lower casing generally designated 50. The upper casing may be made as a separate unit but may also be cast as an integral part of the engine or compressor cylinder block, or integrally with the intake manifold or other engine or compressor part.

Figure 4:
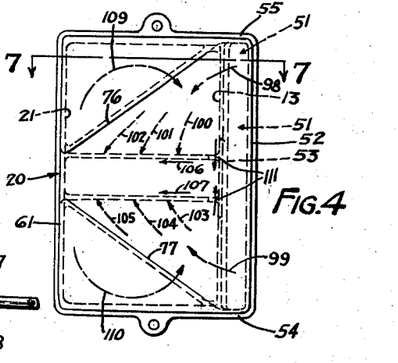
Figure 4 is a bottom view of the device shown in Figures 1, 2 and 3.

The upper casing 10 in the present embodiment of the invention contains an air intake manifold portion generally designated 11 and a separator portion generally designated 20. The manifold portion is of a thin rectangular cross-section, as shown in Figure 4 and is defined by an outer wall 12 and an intermediate wall 13 and by two side walls 14 and 15, respectively.

The upper portion of the air intake manifold 11 is gradually changed in cross-section until it is formed into a round stack 17 and there is a bend in the intake manifold portion at 18 which serves a purpose hereinafter to be explained. The axis of the round stack 17 is offset from the axis of the rectangular portion 11 so that the stack is positioned over the unit assembly and within the outer dimensions of said unit. This is illustrated in Figures 1 and 2 and is also illustrated in Figure 6 wherein the portion 17 is shown in dotted lines.

The separator portion generally designated 20 which in this form of the invention seems to separate the dust and oil from the air stream, is defined by the intermediate wall 13 previously described and by a parallel outer wall 21 and also by portions of side walls 14 and 15. The upper part of the separator portion of the casing is formed into an outlet tube 22 which is of round cross-section, as shown in Figures 1 and 3.

Figures 6, 10, 11:
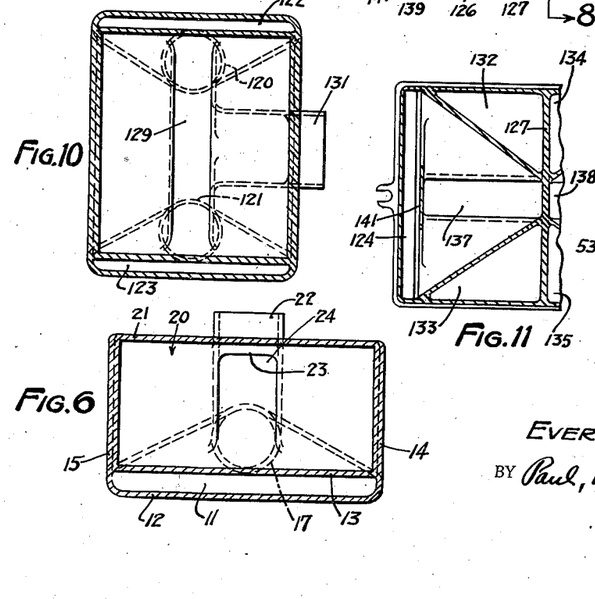
Figure 6 is a sectional view in the upward direction, along the lines and in the direction 6—6 of Figure 1.
Figure 10 is a sectional view along the line 10—10 of Figure 8.
Figure 11 is a fragmentary view along the line 11—11 of Figure 9.

Between the outlet tube 22 and the lower part of the separator portion there is an internal web 23 which is formed to define an outlet orifice of generally rectangular section, as shown at 24 in Figure 6. By referring to Figure 6, which is a sectional view, it will be seen that the separator portion generally designated 20 is of rectangular cross-section defined by walls 13, 14, 15 and 21.

The upper part of the wide walls 14 and 15 are provided with an internal notch, as shown at 26, in Figure 1, which notch provides an upper seat for a stack of separator baffles 27 through 34. The baffles are preferably of a configuration illustrated in Figures 1, 3 and 5 wherein it will be seen that each of the baffles consists of a piece of corrugated material, preferably sheet metal, the corrugations of which are aligned at a bias angle with respect to the longitudinal axis $a$—$a$ of the baffles.

Figure 5:
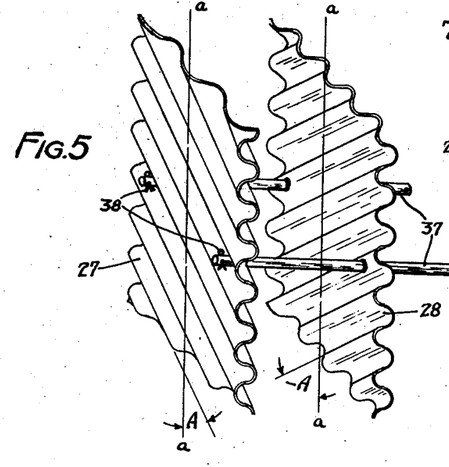
Figure 5 is a schematic isometric view illustrating the manner in which the baffle plates used in the mechanism are assembled, and also illustrating the configuration of the baffle plates. Only two baffles are illustrated and these are not in the normal contiguous relation, but are separated.

Referring to Figures 1 and 5 it will be seen that the longitudinal axis $a$—$a$ is also the axis of the separator portion 20 and as will hereinafter be seen, also the axis of the nozzle. The corrugations of the first baffle 27 (see Figure 1) are disposed at the bias angle A with respect to the axis $a$—$a$. The corrugations of the second baffle 28 are disposed at the bias angle —A, or stated another way, angles A and —A are in opposite directions from axis $a$—$a$. The corrugations of the third baffle 29 are at the bias angle A, while those of the fourth baffle 30 are again reversed at the bias angle —A, and so on, alternately, through the entire stack of baffles from 27 to 34.

It may be stated here that the bias angles need not be uniform throughout the stack but are preferably made so because of economy in manufacture, for by using the same angle throughout, it is necessary to make only one form of baffle plate. In the stack successive baffles are preferably identical but merely reversed.

The baffles 27 through 34 are preferably made of oxidation-resistant metal such as lead-coated steel and may be formed by dies or crimping reels. Where the baffles are formed by dies they may be sheared or ground to accurate dimensions such that the vertical projected area is as illustrated in Figure 1, namely, rectangle with straight sides. However, for simplicity of manufacture it is desirable to form the baffles from a continuous sheet by running the sheet through crimping reels in which case the vertical projection of the lateral edges 36 will have a very slight wavy variation from a straight line. Ordinarily this variation is not sufficient to produce any irregularity of operation in the apparatus because the oil used in the apparatus seals the edges to the casing, and the baffles may be used without further trimming. If desired, however, the edges may be ground to give a perfectly straight vertically projected form.

The angle A of the bias, with respect to the longitudinal axis $a$—$a$ of the baffles and nozzle, (which is likewise the longitudinal axis of the whole separator portion 20 of the device) is preferably from 50 to 70 degrees, although angles outside of this range may be used if desired. Likewise in some instances, particularly where the line $a$—$a$ is not vertical it is desirable to make the angle A different in amount from angle —A, and as previously explained, there may be some variation in amount throughout the plus angles A and the minus angles —A.

As illustrated, the baffles are identical with each other and every other baffle is reversed with respect to the intervening baffles. Stated another way, baffle 28 is identical with baffle 27 but when stacked it is rotated 180 degrees around the axis a—a and accordingly the ridge lines of the corrugations on baffle 28 rest upon and intersect the ridge lines of the corrugations of baffle 27. Baffles 29, 31 and 33 are oriented so that the corrugations thereof are parallel to the corrugations of the first baffle 27 and the baffles 30, 32 and 34 are oriented so that the corrugations thereof are parallel to the corrugations of baffle 28.

In the illustrated embodiment of the present invention the corrugations are shown as being smooth curves but they may be irregularly curved, or have sharp edges or trap curves formed thereon. However, for manufacturing reasons, and other reasons that will be explained, the smoothly curved corrugations are preferred.

The stack of baffles 27 through 34 are punched so as to receive a pair of retaining pins 37 which are of a length slightly less than the space between the inner surface of outer wall 21 and intermediate wall 13. Each of the retaining pins is provided with holes to receive a cotter pin which are illustrated at 28 in Figure 5. The cotter pin holes in the retaining pins are oriented so that the cotter pins 38 at each end of the pin will rest longitudinally of the baffle corrugation in which the pin terminates and thus are within the outer dimensions of the stack of baffles.

The entire upper casing 10 is illustrated as being a unitary casting but it is understood that other methods of fabrication may be used, if desired. Thus, good results are obtained under certain circumstances when utilizing a sheet metal container but for internal combustion engine use where the possibility of backfiring always exists it is desirable to use a cast metal structure of sufficient inherent strength to resist bending due to internal pressures developed within the unit during backfiring. Where sheet metal structures are used for internal combustion engine applications external bracing may be supplied in order to give the unit the requisite strength against bending.

The upper casing 10 is ground or otherwise machined to provide a uniform surface along the line b—b (Figures 1 and 2) and the vertical dimension of the stack of baffles housed in the separator portion 20 is preferably made sufficient that when the stack of baffles is within the separator portion 20 the lower edge 40 will protrude slightly below the line b—b. It is also preferable to thicken the walls of the upper casing slightly along the ground surface of plane b—b so as to provide a sufficient width to form a good gasket seat.

The upper casing 10 is provided with a plurality of fastening devices which in the present modification are illustrated as screws 41 set in integrally cast bosses 42 of the casing. Any other desired form of fastening device may be used.

The lower casing generally designated 50 has the same over-all dimensions in cross section as has the upper casing 10 at the line b—b and the two casing portions 10 and 50 are assembled together in pressure-tight relationship by means of the screws 41 and nuts 43. A pressure-tight gasket is provided at 44 between the two casing portions. It will be noted that the gasket not only provides a pressure-tight connection between walls 12, 14, 15 and 21 of the upper casing, and the corresponding portions of the lower casing but also between the internal wall 13 and the corresponding portion of the lower casing. This is essential for reasons which will be described under the operation of the device.

The lower casing generally designated 50 consists of a vertical manifold portion generally designated 51 which has the same cross sectional area as the lower portion of the air intake manifold section generally designated 11 of the upper casing 10. The vertical manifold portion 51 is defined by an outer wall 52, an intermediate wall 53 and side walls 54 and 55. The outer wall 52 and side walls 54—55 converge slightly as shown in Figure 2 and blend into a horizontal converging portion of the manifold generally designated 57. The horizontal converging portion 57 of the manifold is defined by a bottom wall 58 which slants upwardly from the wall 52 to the opposite outer wall 61.

Figure 7:
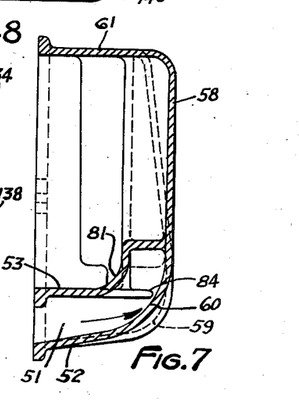
Figure 7 is a sectional view along the lines and in the direction of arrows 7—7 of Figure 4.

Referring to Figure 2 which is a section along the center line a—a of Figure 1 and to Figure 7 which is a section along the line 7—7 of Figure 4 (i. e., a section near the side wall of the unit) it will be seen that the radius of the curve between the wall 52 and the wall 58 varies from the center to the edges of the unit. At the center of the unit the radius is a minimum as illustrated by the curve 59 while near the side walls of the unit the radius is somewhat larger, as illustrated by the curve 60. This variation in the radii in the manifold at this point serves, with other features which will be explained, to provide a desired distribution of the air flowing through the manifold, particularly as the air enters the horizontal converging portion 57 of the manifold.

The upper wall of the horizontal converging manifold section 57 is defined in part by the bottom wall 63 of a sump generally designated 64 (see Figure 3) and in part by a corresponding bottom wall 67 of a sump generally designated 68. The bottom walls 63 and 67 of the two sumps extend horizontally to edges 69 and 70, respectively, which are preferably fairly sharp edges. At this point the bottom walls 63—67 join the vertical walls 72 and 73 which extend from the intermediate wall 53 to the outer wall 61. The space between the walls 72 and 73 and intermediate wall 53 and outer wall 61 defines a nozzle 75, which is aligned with the center line axis a—a. The axis a—a is therefore also the axis of the nozzle 75.

The lower casing also includes a pair of diagonally disposed walls 76 and 77 which in part define the sumps 64 and 68, respectively, and in part define the converging walls of manifold section 57. The walls 76 and 77 extend downwardly to the sump bottoms 78 and 79, respectively.

The junction of the walls 63 and 67 of the sump with the intermediate wall 53 is sharp adjacent the nozzle but is gradually increased in radius toward the side walls 54 and 55. Thus in the regions 80 and 81 of walls 63 and 67, respectively, the radius of curvature is a maximum. These curvatures are illustrated in Figure 7. It will be seen that the curve 81 is struck about the same center point as the curve 60 of the outer wall 52. This feature of the manifold permits a smooth streamline flow of the air near the side walls 54 and 55 but produces a more turbulent and accordingly restricted flow along the axis a—a of the unit.

A further restriction is provided in the form of a web 84 which extends downwardly into the manifold. The web is illustrated in vertical projection in Figure 1, and in perspective, in the lower portion of Figure 3. In both of these figures it is shown to extend at each side beyond the width of the nozzle 75. The width of web 84 depends upon the length of nozzle 75 between walls 53 and 61, the width of the web being increased for longer nozzles. At the points 85 and 86 the web is narrowed and after abrupt narrowing continues to slant off along the lines 87 and 88 until it blends into the intermediate wall 53 at points between the center line a—a and the side walls 54 and 55.

Sharp corners are provided at 90 and 91 where the under side of the sump bottom portions 63 and 67 join the web portion 84 of the vertical intermediate wall 53. These sharp corners serve a useful purpose in the present embodiment of the invention as will hereinafter be described.

The walls 72 and 73 are provided with a pair of notches 93 and 94, respectively, where they join the intermediate wall 53, and there may be additional notches provided at intermediate points of the walls and at the opposite ends, if desired. In some modifications, however, I may dispense with the notch entirely or may provide merely a decreased height of walls 72 and 73 from a maximum near external wall 61 to a minimum equal to about the lowest part of the notches 93 and 94, near the intermediate wall 53.

*Operation of single unit engine cleaner*

During operation of the device just described a quantity of oil or other cleansing medium is placed in the sump bottoms and manifolds until it reaches the level c—c of Figure 2. When the device is idle oil lies in the sumps and the horizontal converging portion 57 of the manifold and oil thus seals the passage from intake stack 17 to outlet pipe 22. When the engine or compressor is started air flows into stack 17 in the direction of arrow 95 and continues around the smooth bend at 18 in the direction of arrow 96. (See Figure 2.) The flow continues downwardly through portions 11 and 51 of the manifold until the air impinges against the curved surfaces 59—60 (Figure 7).

Due to the more gradual curvature of the manifold near the side walls 54 and 55 (curve 60 of Figure 7) the air flow will be smoother and more easily attained near the side walls. This effect is also enhanced due to the depending web 84 which protrudes downwardly in line with wall 53 into the horizontal converging portion 57 of the manifold, and also due to the fact that the curvature between wall 53 and the sump bottom portions 63 and 67 is more gradual near the points 80 and 81 near the side wall than near the nozzle 75. As a consequence the air stream flowing downwardly through the manifold portions 11 and 51 is divided into two portions which generally follow the arrows 98 and 99 (see Figures 3 and 4). It must be understood, however, that all air flow is not prevented near the center line a—a but is merely reduced in this region. As the flow reaches the horizontal converging portion 57 of the manifold it is deflected toward the nozzle by vertical walls 76 and 77 and also by the swirl induced by the depending web 84, with the result that the flow is distributed evenly toward the nozzle area in the direction of the arrows 100, 101 and 102 under bottom 63 and the arrows 103, 104 and 105 under bottom 67 (see Figure 4). The rush of air through the manifold in the first instance forces the oil in the manifold upwardly against the baffles 27—34 from which it returns to the sumps 64 and 68, as will be described. The oil projecting against the baffles produces a viscous, coated surface of large dimensions against which the air passing through the unit is projected again and again, and as will be pointed out below, any dust particles in the air will become entrained in the oil of the viscous, coated surface and thereafter will be circulated with the oil into the sumps.

After the oil is forced out of the horizontal converging portion 57 of the manifold by the rush of air and is returned to the sumps the operation depends upon the velocity of air through the unit and this in turn depends upon the speed of the engine or compressor which the unit is serving.

At relatively low speeds of operation, a relatively low air velocity will be produced in the manifold and nozzle 75 and the oil will accordingly return predominantly through the notches 93 and 94 and to some extent also the oil will return over the upper edges of the nozzle walls 72 and 73.

Considerable regurgitation of the oil will occur in the nozzle and manifold and large masses of oil will be impinged against the baffles along with the air flowing through the nozzle. The baffles are accordingly filled with oil and the desired viscous, coated surface is produced. During this condition of operation the oil will be pulled upwardly in the baffles to about ¼ of their height, and will be broken into a fine foam of oil and air. As the oil-air foam rises in the baffles the foam is gradually broken down. The oil used is ordinary automotive lubricating oil has a viscosity of from S. A. E. 10 to S. A. E. 60, depending upon the temperature conditions of operation, and the like. The oil foam produced in the baffles effectively scrubs the air and removes any entrained dirt and as the foam rises the air is withdrawn therefrom and is withdrawn free from oil and dirt at the outlet 22 of the unit. Due to the action of the baffles the oil is guided toward the side walls out of the path of most rapid upward air movement through the baffles, and the oil then gravitates to the sumps where under the relatively quiet conditions prevailing the dirt is settled out and deposited. The oil is recirculated again and again through the path described.

At somewhat higher air velocities corresponding to intermediate speeds of operation, more of the oil will be carried in the baffles as foam, due to the fact that the oil-foam level reached in the baffles is raised as the rate of operation increases. Hence, there will be less oil in the sumps and the return flow will be primarily through the notches 93 and 94 rather than a profuse flow through the notches accompanied by additional flow over the wall 72—73 as occurs at low speeds of operation. Under this condition of operation the blast of air through the manifold 76 turns sharply around the edges 69 and 70 of the nozzle as it is directed upwardly, and produces a condition of lowered air pressure in the region slightly above the edges 69 and 70 and immediately adjacent the walls 72 and 73 and as a consequence oil is drawn from the notches and from along the walls in the direction of arrows 106 and 107, (see Figures 2 and 4). The oil is thus presented at the sharp edges 69 and 70 and as it sags to the edges is torn off into fine droplets by the up-rush of air across the sharp edges. The oil torn off edge 69 is thrown toward and against the oil from edge 70 and by thus impinging the two air-oil flows a fine spray is formed and the oil is kept circulating against the baffles. In this condition of operation also the baffles are kept in viscous coated condition.

Beginning at intermediate velocities a slight vacuum is drawn along the surface of the downwardly extending web 84 which is towards the nozzle, due to the fact that the air cannot easily come around the edges of the web into that area, and as a consequence there is a slight down rush of air along the web 84 from the baffle region to near the tip of the web as shown by the arrows 111—111 (Figures 2, 3 and 4). As the velocity through the nozzle is increased, this slight vacuum increases and air and oil is drawn from the adjacent portions of the sumps 64 and 68. This action creates a swirl of considerable velocity in the sumps under the baffles and the oil in the sumps is rotated in whirlpool fashion, the direction of rotation in sump 64 being illustrated by arrow 109 and the direction of rotation of the oil in the sump 68 being illustrated by arrow 110. At maximum velocities this whirlpool rotation is sufficient to scrub oil along the walls 54 and 55 to wall 53 and thence from each end of wall 53 toward the center adjacent the nozzle. The oil is driven in a film along walls 53 but gathers in a rivulet illustrated by the arrows 111—111 in Figure 4. The rivulet gathers slightly above the level of the notches, and then follows the web 84 downwardly and divides. Part of the oil goes outwardly in each direction along the sharp inner corners 90 and 91 between the web 84 and the underside of the sump bottoms along the slanting parts 87 and 88 of the web 84. The swirl of air under the lower edge of the web produces a slight reduction in pressure along the inner corners 90—91 and hence the oil follows out along the inner corners and gradually distributes on the underside of the sump bottoms where it clings and is driven along the sump bottoms to the nozzle edges 69 and 70. Thus during maximum flow oil is also delivered to the sharp edges 69 and 70 of the nozzle and is accordingly broken into a fine spray and projected against the baffles, as described above. It is a peculiar fact that during relatively high velocities through the nozzle 75 no oil returns to the nozzle by way of notches 93 and 94, all of the oil being returned by the wash of oil along the wall 53 in the direction of arrows 111, as just described. During such high velocities tilting the cleaner causes little change in operation since the oil flows and movements are predominantly under the influence of air pressure and vacuum conditions in the various regions of the cleaner.

It may be stated here that the action above described is not materially varied by dispensing with the notch and utilizing either the level or slanting wall construction of the nozzle, previously described.

Under all conditions of operation, that is to say, from low velocities of air through the nozzle as during idling, to high velocities of air through the nozzle as during high speed loaded conditions the oil-air mixture is projected against the stack of baffles throughout the area of the nozzle 75 and in the direction of axis $a$—$a$. The air is withdrawn from the top of the baffles through the rectangular outlet passage 24. The flow through the baffle stack is highly redirected, but the average direction of least resistance is within the lines $e$—$e$ and $d$—$d$ (Figure 1) which are defined by the nozzle and outlet passages, and movements outside the zone are increasingly restricted as the distance from lines $e$—$e$ and $d$—$d$ is increased.

As the air-oil spray is impinged against the baffles it is broken into a number of streams due to the fact that there is no straight passage through the stack of baffles. It is possible for the flow to traverse lengthwise of any corrugation a short distance but it is not possible to go from nozzle 75 to outlet passage 24 by merely traversing along a single corrugation because no one corrugation reaches from the top to the bottom of the stack. Furthermore where the groove of each corrugation crosses the grooves of the corrugations of the adjacent baffle, the air stream in the corrugations will be violently disturbed by the air streams in the adjacent corrugations, with the result that smooth flow of air through any corrugation is impossible.

The flow through the stack of baffles can be visualized as a path through one corrugation for a slight distance and then over the corrugation into the angularly disposed corrugation of the next baffle, then back along the latter corrugation until it intersects the space provided by a corrugation parallel to the one first considered, and so on through a number of back and forth traverses until the complete distance between the bottom and top of the stack of baffles has been traversed.

The number of changes in direction made by a given particle of air traversing through the baffle cannot be accurately computed but it is estimated to be at least seven complete revolutions if the particles of air travel by the most direct route through the baffle and very probably many more revolutions.

As stated above the line of least resistance to the flow is in the space between planes $d$—$d$ and $e$—$e$ (Figure 1), e. g., the area of the nozzle 75 projected upwardly to the rectangular area 24 of the outlet pipe. Any longer path such as along line $f$—$f$ adds restriction and the quantity and velocity of air flow are accordingly decreased to lesser and lesser amounts as the distance from the lines $e$—$e$ or $d$—$d$ is increased. Hence near the side walls 54 and 55 there is but little flow and the oil may trickle back to the sump, little impeded by the up rush of air. The considerable number of changes of direction engendered by the baffle structure, together with the fact that the baffles are covered with oil eliminates all but a very minor fraction of the amount of dust carried by the air.

The particles of oil and dust in the flow being heavier than the air tend to follow along the trough of the corrugations rather than to change direction and follow around the curve of the corrugation and as a consequence the particles of oil and entrained dust are moved away from the center line of the nozzle (axis $a$—$a$). As the oil and entrained dust move out of the zone of high air velocity the oil begins to return under the influence of gravity to the oil sumps along an average path exemplified by arrows 112 and 113 (Figure 1). It is to be understood, of course, that the oil return path is not confined to the smooth paths of arrows 112 and 113 but is rather a general movement made up of multiple redirections, which all considered, give the average directions illustrated. Due to the tendency of the oil to move along the corrugations rather than over them it tends to move out of the central zone defined by lines $d$—$d$ and $e$—$e$, and as it does so, the upward movement is decreased due to the lesser up rush of air outside that zone. Hence as the oil moves farther out of the central zone its upward velocity is decreased and it begins to sag and run over the baffles, and along the grooves from one to another and finally drips into the sumps. In so doing any particles of dust or moisture that are separated from the air by entrainment with the oil are likewise washed in the sump where they settle to the floor of the sump and accumulate.

As the amount of foreign material trapped in the sumps increases, the idle level of the oil in the sumps is raised gradually above the normal level represented by the line c—c (Figure 2) but it has been found that increases in the oil level do not measurably decrease the efficiency of the cleaner, even when the oil has been brought close to the lower surface of the baffles. Thus the cleaner may be used for long periods without removal of the lower unit 50 and the baffles for cleaning.

When it is desired to clean the unit the two nuts 43 are removed from the retaining studs 41 and the lower unit 50 of the assembly is dropped down. The baffles being fitted snugly but not tightly within the upper casing can then be withdrawn downwardly, or may drop down under their own weight. The baffles are held in loosely assembled relation by pins 37 and as a consequence the baffles do not fall apart from each other but can be separated a slight distance for cleaning in any suitable cleaning fluid, such as gasoline or kerosene and by brushing. The sumps may likewise easily be cleaned and the entire unit then reassembled by lifting the baffle assembly into the upper casing 20, in which position they are held by the lower cup portion 50 of the assembly.

The gasket between the lower unit 50 and the upper unit 10—20 provides a pressure-tight seal around the periphery of the casing and also between the lower intermediate wall 53 and the upper intermediate wall 13. It is important to have the intermediate walls sealed in pressure-tight relationship so as to prevent dust-ladened air from entering directly against the baffles without first traversing the nozzle for mixture with oil.

For automotive operation where backfiring is always a possibility it is desirable to have an offset in the intake manifold of the cleaner. In the present apparatus this is illustrated by the curvature 18 between the rectangular portion 11 of the manifold and the circular portion 17. If backfiring should occur oil would be driven upwardly through the intake manifold 11. As the oil reaches the curve 18 it is impinged thereagainst and its loss is restrained, whereas the air can easily traverse the curve and is expelled through the stack 17. The oil is therefore not lost during backfiring.

Multiple unit engine air cleaner

The volumetric capacity of the cleaner described herein may be varied by varying the number of baffles in the stack, the minimum being three baffles and the maximum being any number desired. This requires a shortening or lengthening of the nozzle 75 in the event a nozzle structure is used in conjunction with the baffle assembly.

It is sometimes undesirable, however, to lengthen the nozzle and accordingly for a cleaner of larger capacity a "double" unit is used in which a plurality of nozzles are used in parallel to increase the capacity. The units may be entirely separate, each with its own stack of baffles or the nozzles may be arranged in line with each other and used with a single larger set of baffles. A device of this character is illustrated in Figures 8, 9, 10 and 11.

Figures 8, 9:
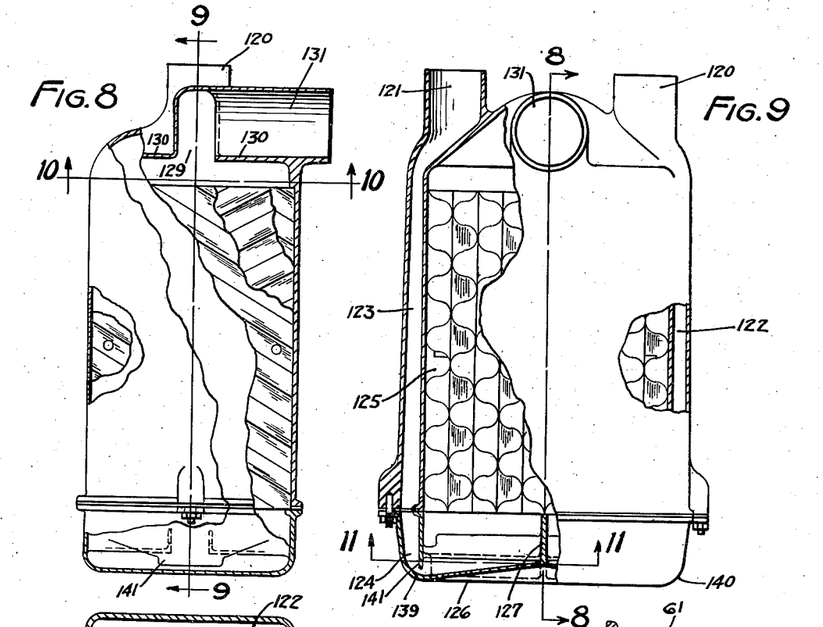
Figure 12:
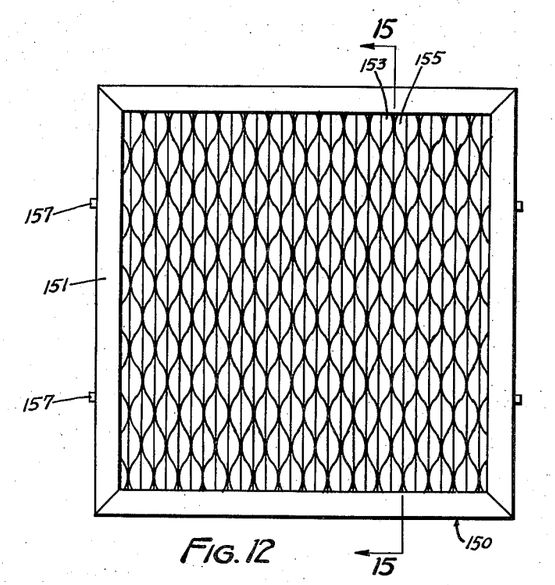
Figure 13:
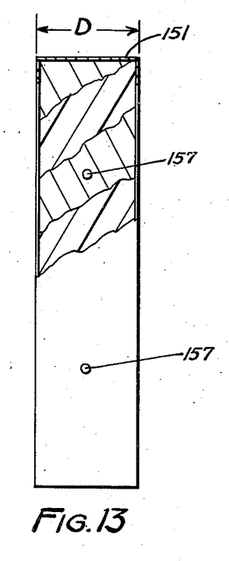
Figure 13 is a side elevational view of the device shown in Figure 12, broken away along successively lower planes so as to illustrate successive layers of the filter element.

By comparing Figures 2 and 9 it will be seen that the device illustrated in Figure 9 is composed of two units of the type shown in Figure 2 set back to back. Thus there are two intake stacks 120 and 121 of circular cross section at opposite sides of the multiple or "double unit," each of which stacks blend into two intake passages, 122 and 123. These intake passages are of thin rectangular cross section, as shown in Figure 10 and continue downwardly and communicate with intake passages in the bottom portion of the unit as shown in the sectioned half of Figure 9 at 124 (compare Figure 6). The space 125 between intake passages 122 and 123 is filled with a stack of baffles in the same manner as the space 20 of Figure 2 was filled with baffles 27 through 34. However, in Figure 9 the number of baffles is increased in order to accommodate greater air flow than is accommodated by the number of baffles in the modification shown in Figure 2 and one continuous stack of baffles serves both nozzles.

The lower removable portion 126 of the unit shown in Figures 8 and 9 is in effect composed of two units of the type shown in the bottom view Figure 4, the units being set with the walls 61 together. The two units thus joined have a common wall illustrated at 127 in Figure 9.

The outlet manifolding structure of the unit shown in Figures 8 and 9 is similar to that of the unit illustrated in Figures 1 through 7, in that an outlet passage 129 (see Figure 10) is provided which extends transversely of the baffles above the nozzle between the sumps. The outlet passage 129 is defined by the top wall 130 of the unit. The outlet tube 131 in this modification connects with the transverse passage 129 and conducts the cleaned gases away from the unit.

By referring to Figure 11 which is a fragmentary section of the lower portion of the double unit it will be seen that there are four sumps, one pair 132 and 133 being to the left of the center wall 127, and the other pair 134 and 135 being to the right of center wall 127. The nozzle portion is likewise divided into two parts by the center web 127, one nozzle portion 137 being at the left of web 127 between sumps 132 and 133 and the other nozzle 138 being at the right of web 127 between sumps 134 and 135. In the double modification, as in the previously described apparatus the flow of air through the intake manifolds 122 and 123 is distributed and to a certain degree divided by suitably curving the manifold passage at the bends 139 and 140 where the vertical portion of the manifold joins the horizontal converging portions of the manifold, and by depending webs 141.

The operation of the device illustrated in Figures 8 through 11 is identical with the operation of the device shown in Figures 1 through 7 except that the intake air flow is divided into separated portions in the two symmetrical halves of the unit. The operation at low, intermediate and high rates of flow capacities is the same as that described above for the device shown in Figures 1 through 7. The oil in all cases is drawn against the baffles and intimately intermingled with the air to produce the cleaning.

Examples

By using the single or the double modifications illustrated respectively 1 through 7 and Figures 9 through 11 maximum volumetric capacities ranging from small sizes such as ten cubic feet per minute to more than 300 cubic feet per minute may easily be obtained. Without limiting the scope of the invention and merely by way of further illustration the following dimensions are given: For an engine using one hundred cubic feet per minute a unit of a desirable size is one having one nozzle and a stack of twelve baffles. For such an engine, the baffles are preferably six inches wide and seven inches high and preferably have uniform corrugations formed thereon at an angle of about twenty-eight degrees, the radius of curvature of the corrugations being approximately $\frac{1}{16}$ths of an inch. The twelve baffles are used stacked together and transversely disposed with respect to a nozzle, which for such an engine would have a length of approximately four and one-half inches and a width of approximately one inch. An air cleaner unit of such dimensions would have an over-all height of approximately 13 inches and over-all dimensions in cross-section, of approximately six inches by seven and three-quarters inches. When using ordinary automotive engine lubricating oil of, for example S. A. E. 20 viscosity, as a cleaning agent, 98 per cent of dust particles in an air stream are removed, even when the dust is of the finest character such as Arizona field dust having a particle size of five microns or smaller. At the maximum rate of operation of 100 cubic feet per minute the air pressure drop across an air cleaner of the dimensions given will be slightly more than six inches of water pressure from the intake stack to the outlet tube. Nearly all of this pressure drop is through the manifolding and nozzle, and very little pressure drop, namely less than ¼ inch of water pressure occurs through the baffle stack. There is no oil pullover at high idle speed, under heavy load conditions, or under high oil level conditions which may be obtained when the cleaner becomes loaded with dust.

For proportionately larger or smaller engines the units require proportionately a lesser or greater number of baffles in the stack and proportionately shorter and narrower or longer and wider nozzles. For example, the ten cubic feet per minute unit requires three baffles and the 300 cubic feet per minute unit requires 32 baffles of the size described. Of course, by changing the size of the baffles, or the dimensions or shape of the corrugations, or the bias angle, the number of baffles required is varied. For engine capacities in excess of 140 cubic feet per minute it is preferable to use the double unit construction.

It is to be distinctly understood, however, that wide variations may be made in the dimensions given above. The baffles of different area may be used and larger or smaller corrugations may be used. The angle of the corrugations with reference to the axis $a$—$a$ may likewise be varied. Similarly the shape and configuration of the nozzle and shape and configuration of the sumps, the type of intake manifolding and outlet passageway may be widely varied to meet conditions of installations.

Units for large volume and low restriction

In some instances where it is undesirable to have pressure drops of the order and magnitude given above, for example, in air conditioning installations and the nozzle and sump structure herein illustrated may be dispensed with and the baffle stack used alone or in conjunction with other apparatus.

Figure 14:
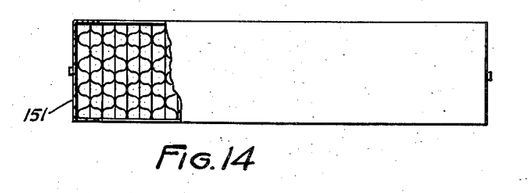
Figure 14 is a top view of the device shown in Figure 12, with part of the frame broken away to illustrate the top edge of the filtering elements.
Figure 15:
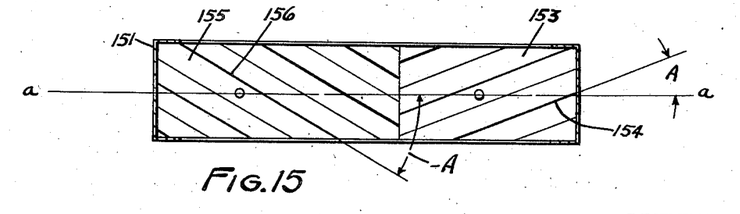
Figure 15 is a sectional view taken along the line 15—15 of Figure 12.

An air filter unit of this type is shown in Figures 12 through 15 and is composed of a frame generally designated 150 made of sheet metal or stiff cardboard channel, as illustrated at 151 in Figure 14. The channel frame is mitered at the corners and fastened in any suitable manner. Within the frame 150 there is a stack of baffle plates, each of which is of sheet material formed with bias corrugations. Adjacent baffles have the angle of bias set in opposite directions with respect to a transverse center line (or center plane) $a$—$a$ through the unit. Thus, as shown in Figure 15, baffle plate 153 has corrugations 154 which are set at angle A with respect to the center line $a$—$a$, whereas baffle plate 155 has corrugations 156 which are set at angle minus A (—A).

The baffle plates may be of corrugated paper coated with a viscous oil or other viscous material, where the filter unit is to be discarded after use, or the baffles may be of sheet metal, for example sheet copper, where the unit is used, and then washed and recoated with viscous material for reuse in the system, or where the unit is continuously flushed with an oil or water spray.

The size and shape of the corrugations and the angle A of the baffles in the unit shown in Figures 12 through 15 may vary widely, and in some instances it is desirable to use corrugations of varying but not identical angles A and minus A. These factors and also the depth D of the unit depend upon the permissible pressure drop, dirt holding capacity, and other factors of design and may be widely varied to fulfill the requirements of individual installations.

Where the baffles may be composed of corrugated paper fabricated and stacked in the manner herein illustrated, and are preferably braced and retained by pins 157 when made of corrugated paper they are coated with an oily or sticky coating capable of intercepting and holding dust particles impinged thereagainst. As the surface becomes coated with dust its capacity will gradually decrease and its efficiency will be lowered. When the efficiency has dropped to a predetermined minimum the unit is discarded and replaced by a fresh unit. For the throw any type of the permanently coated unit the surface of the corrugations may also be coated with a mucilaginous compound composed of gum, water and a hydroscopic agent capable of drawing water from the air so as to maintain the coating moist, may be used. Where the unit is permanent the coating can be flushed off when it becomes loaded with dirt and recoated by spraying or dipping for the next period of operation. In some instances I prefer to use a continuous spray or drip of oil or water in the unit, to provide the desired viscous coating and also to flush the collected dirt into a sump. For such installations a spray or drip of oil or water is applied continuously to the upstream face of the unit when the latter is in the vertical position and the residue permitted to drip from the base of the unit into a sump. A recirculation of the oil or water may be afforded if desired by using a suitable pump.

Units for separating liquids from gases

In water traps in steamlines and similar units in other installations the engine units above illustrated may be used when provided with a drain for continuously removing the collected condensate. The condensate is separated from steam in exactly the same manner, as the oil is separated from the air-oil mixture established in the air-cleaner unit.

It is obvious that many widely and varying modifications may be made in the herein illustrated apparatus without departing from the spirit of the invention disclosed. Where the unit is used as an air cleaner for an internal combustion engine, air compressor or the like, it may advantageously take either of the forms illustrated herein, or variations of the device illustrated. Where the baffle stack is used alone as the "air filter" it may, as previously described be made of metal or paper or any other suitable substance and may be coated with a variety of tacky or adherent material capable of gripping and holding the dust particles in the air stream. The baffle stack may be held in assembled relation by the means illustrated or a groove may be formed in the edge of the stack to receive a retaining pin or wire. For baffles of the type that are discarded it is preferable to place the stack of baffles in a carton or frame although other methods of assembly may be utilized, if desired. These and many other obvious variations will occur to those skilled in the art and are deemed to be within the scope of the invention herein disclosed.

Having thus described the invention, what I claim is:

1. An article of manufacture comprising a pair of rectangular sumps, the sumps being in substantially the same plane and oriented with a sidewall of one sump parallel with and spaced from a side wall of the other sump so as to form a nozzle space therebetween, a manifold having a converging portion beneath the sumps communicating with and terminating in the nozzle space between the sumps, said manifold having an inlet extending above the sumps whereby fluid is contained in the sumps and nozzle space during idle conditions and the converging portion of the manifold being longitudinally aligned with the nozzle space between the sumps whereby gases flowing in the manifold are uniformly distributed to the nozzle space.

2. An apparatus for cleaning gases comprising a vertically aligned nozzle of rectangular cross section for projecting a blast of said gases vertically along a predetermined axis, a rectangular conduit of larger dimensions than the nozzle connected to the nozzle and aligned with said predetermined axis for receiving the blast of gases from said nozzle and a plurality of baffle plates stacked substantially parallel with each other in said conduit and aligned with said predetermined axis, said baffle plates extending across the nozzle a substantial distance on either side, each of said plates being formed with bias corrugations transverse to said predetermined axis, the angle of bias of the corrugations of successive plates being reversed.

3. An apparatus for cleaning gases comprising a nozzle of rectangular cross section for projecting a blast of said gases along a predetermined axis, a conduit of rectangular cross section having a cross sectional width equal to the major cross sectional dimension of the blast nozzle and a cross sectional length several times the minor cross sectional dimension of the blast nozzle connected to the nozzle and aligned with said predetermined axis for receiving the blast of gases from said nozzle and a plurality of baffle plates stacked substantially parallel with each other and to the major dimension of the conduit in said conduit and aligned parallel with said predetermined axis and extending a substantial distance on each side of the nozzle, each of said plates being formed with bias corrugations transverse to said predetermined axis, the bias of the corrugations of adjacent plates being in opposite directions with reference to said axis.

4. An apparatus for cleaning gases comprising a nozzle for projecting a blast of said gases along a predetermined axis, a conduit connected to the nozzle and aligned with said predetermined axis for receiving the blast of gases from said nozzle and a plurality of baffle plates stacked substantially parallel with each other in said conduit and aligned with said predetermined axis and extending a substantial distance on each side of the nozzle, each of said plates being formed with bias corrugations transverse to said predetermined axis, the angle of bias with respect to the axis of the corrugations of adjacent plates being in opposite directions with reference to said axis and 50° to 70° with respect to said axis.

5. A vertically positioned apparatus for cleaning gases comprising a vertically positioned nozzle of rectangular cross section for projecting said gases upwardly along the vertical axis of said nozzle, a receiver for gases comprising a conduit connected to the nozzle and extending axially upwardly therefrom, said conduit being of greater cross section than said nozzle so as to extend across on opposite sides thereof, a plurality of baffle plates in said conduit, said plates being stacked substantially parallel to each other and to said axis, and oriented in said conduit so as to have the edges thereof extend across the nozzle a substantial distance on either side thereof, each of said plates being corrugated upon a bias angle with respect to the axis of the nozzle, the bias angle of adjacent plates being in opposite directions with respect to said axis.

6. An air cleaner comprising a manifold having a downwardly extending portion joined with a substantially horizontal portion, a nozzle having an upward directed delivery axis connected with said horizontal portion, an oil sump near said nozzle, said pump being shaped to deliver oil into said nozzle, and a separator chamber overlying the nozzle and sump and connected thereto for receiving the discharge from said nozzle, and a plurality of baffle plates situated in the separator chamber, said plates being stacked substantially parallel to each other and coaxially to the nozzle, each of said plates being corrugated on a bias angle with respect to the axis of the nozzle, the bias angle of successive plates being measured in opposite directions with respect to the axis of the nozzle.

7. An air cleaner comprising a pair of oil sumps each having a bottom surface terminating in a substantially horizontal edge at the side wall of each sump, said sumps being in substantially the same plane and oriented with their edges and side walls spaced from each other in opposed relation to form an upwardly terminating nozzle space therebetween, manifold means under said sumps for delivering air across the bottom surface of each sump toward said edges and nozzle space, means for delivering oil from said sumps into the manifold and onto the underside of the bottom surfaces of the sumps, whereby the oil is projected across said surfaces to said opposed edges and is projected from each edge toward the other edge, and an oil-air separator overlying the oil sumps and nozzle and connected thereto.

8. An air cleaner comprising a pair of oil sumps each of which has a bottom surface which joins at an edge with a substantially straight and substantially vertical sump side wall, said sumps being in substantially the same plane and oriented with their straight side walls spaced from each other and substantially parallel, to form an upwardly terminating nozzle therebetween, manifold means formed under said sumps and nozzle and defined in part by the bottom surfaces of the sumps for delivering air across the bottom surfaces thereof toward said edges and the upwardly terminating nozzle therebetween, an oil conducting web extending from the sumps into the manifold for delivering oil from the sumps to the under surface of said sump bottoms, and an oil-air separator spaced above the sumps and nozzle and connected thereto.

9. An air cleaner comprising an upper housing having a vertical axis, said housing being of rectangular cross section, a plurality of baffles stacked vertically in said housing, the number of baffles being sufficient to fill said housing, each of said baffles being a metal plate corrugated on a bias angle with reference to said vertical axis and of generally rectangular vertically projected dimensions, the direction of the bias angle of each plate with reference to the vertical axis being opposite to the direction of that of the next adjacent plate, and a lower housing, means for removably attaching said housings in airtight relationship, said lower housing including a nozzle of substantially less width than the baffles extending transverse thereto, oil sumps in said lower housing at each side of the nozzle, air manifold means in the lower housing beneath the sumps and nozzle for delivering air to said nozzle and a web in said lower housing extending from the sumps into the manifold for delivering oil from the sump into the manifold and for dividing the air flow in said manifold.

10. A liquid-gas separator assembly comprising a plurality of plates stacked directly against each other, each of said plates being formed with a series of bias corrugations, each plate being reversed with respect to adjacent plates and a rod extending through holes in the plates, the rod being of such a length as to terminate within corrugation spaces of the end plates of the stack and fastener means on the rods within the corrugation space at each end, the spacings of the fastener means at each end of the rod being sufficient to allow slight separating movement of the plates in assembly for facilitating cleaning.

11. A liquid-gas separator assembly comprising an even number of identical plates each having bias corrugations, there being a pair of holes through each plate along line a midway between the ends of the plates and at equal distances from the center line of the plates, the holes being through the crests of the corrugations, successive plates being reversed with the end plates stacked so that the holes are located on the crests of corrugations contacting an adjacent intermediate plate, rods through each hole of each plate the rods having a length such that they terminate in the troughs of the corrugations of the end plates when the plates are tightly packed and retaining means on the rods spaced from the plate but within the troughs of the corrugations, permitting slight separation of the plates while retained on the rods thereby facilitating cleaning.

12. A combined oil blast nozzle and sump comprising a bottom and side walls extending upwardly therearound, an interior wall spaced from the bottom of the sump, extending and across the sump substantially parallel to a side wall and adjacent thereto so as to define an air inlet space, a pair of intermediate nozzle walls spaced from the bottom of the sump extending at approximately right angles across the sump from the interior wall and sub bottoms connected with the bottom edge of the interior wall and each nozzle wall and converging across the sump, said sub bottoms being connected to the sump bottom along the converging edges, whereby a converging air inlet joined to the air inlet space is provided under the nozzle.

13. A device of the type set forth in claim 12 including a centrally located lip extending downwardly from the under edge of the interior wall into the manifold thereby to distribute the air flow evenly into the nozzle.

14. A device of the type set forth in claim 12 wherein the intermediate nozzle walls are notched adjacent the interior wall.

EVERETT N. WOOD.